May 14, 1946.  E. K. HANSEN  2,400,086
PORTABLE ELEVATOR
Filed Feb. 20, 1945  3 Sheets-Sheet 1
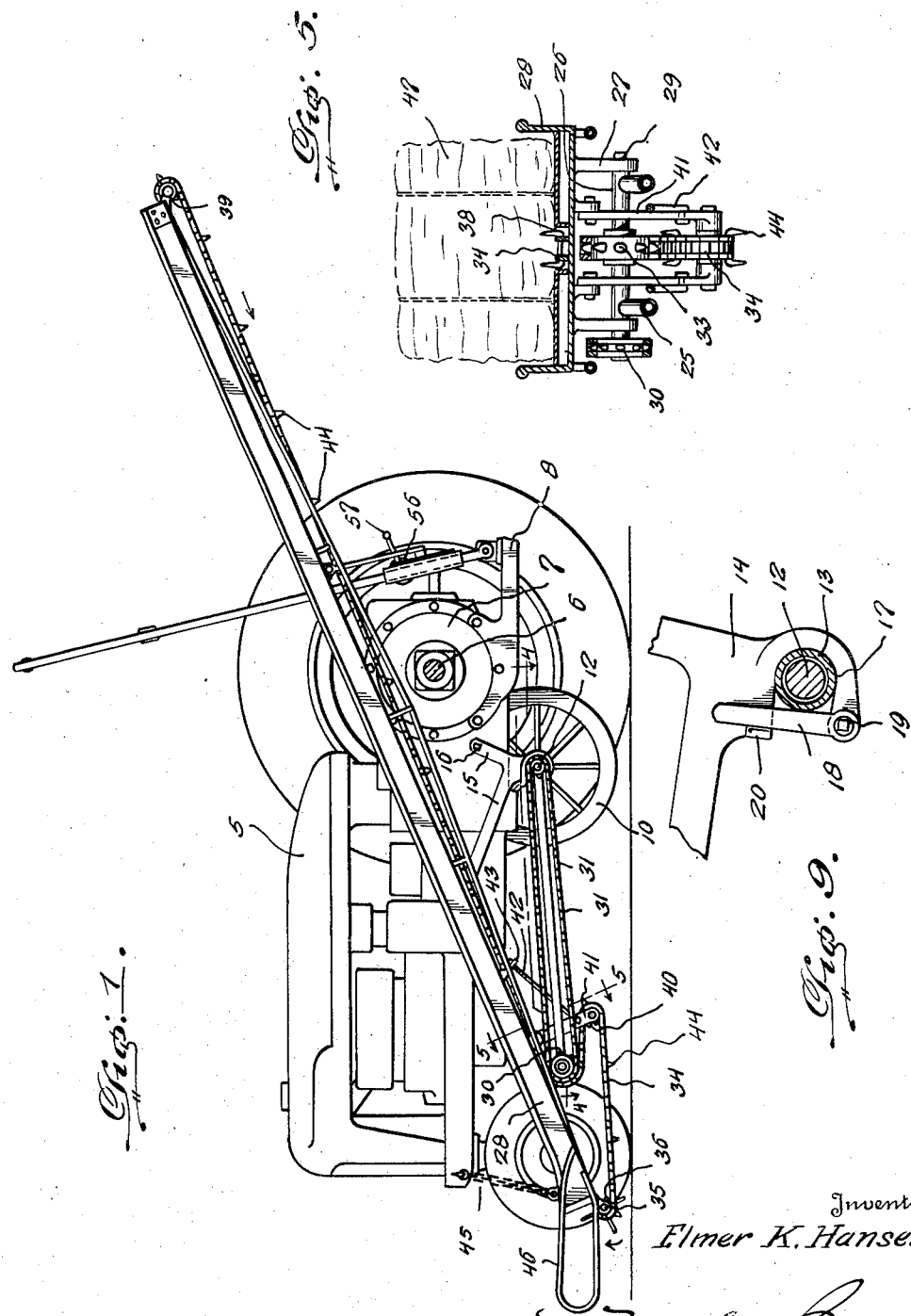
Inventor
Elmer K. Hansen,

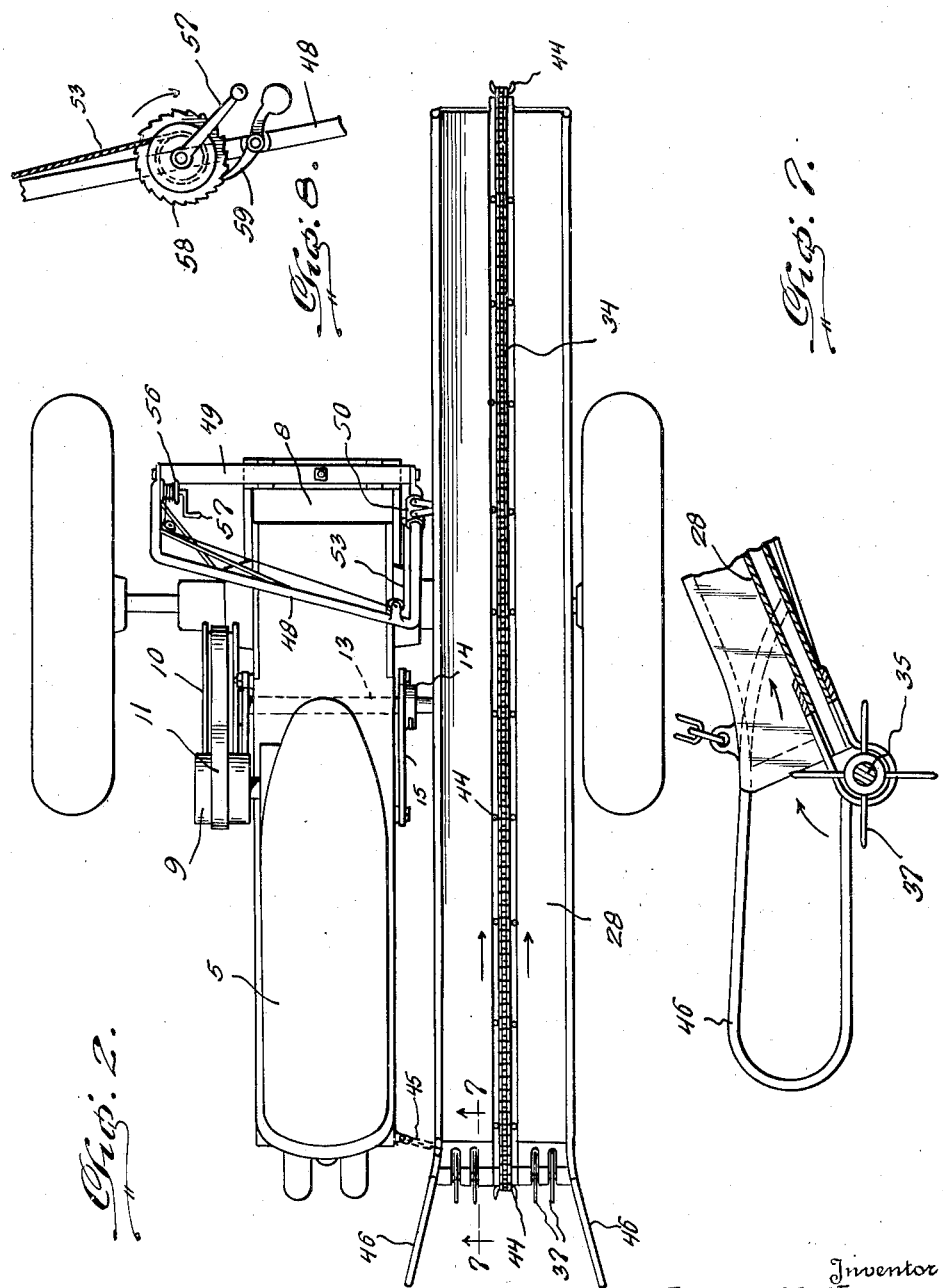

May 14, 1946. E. K. HANSEN 2,400,086
PORTABLE ELEVATOR
Filed Feb. 20, 1945 3 Sheets-Sheet 3
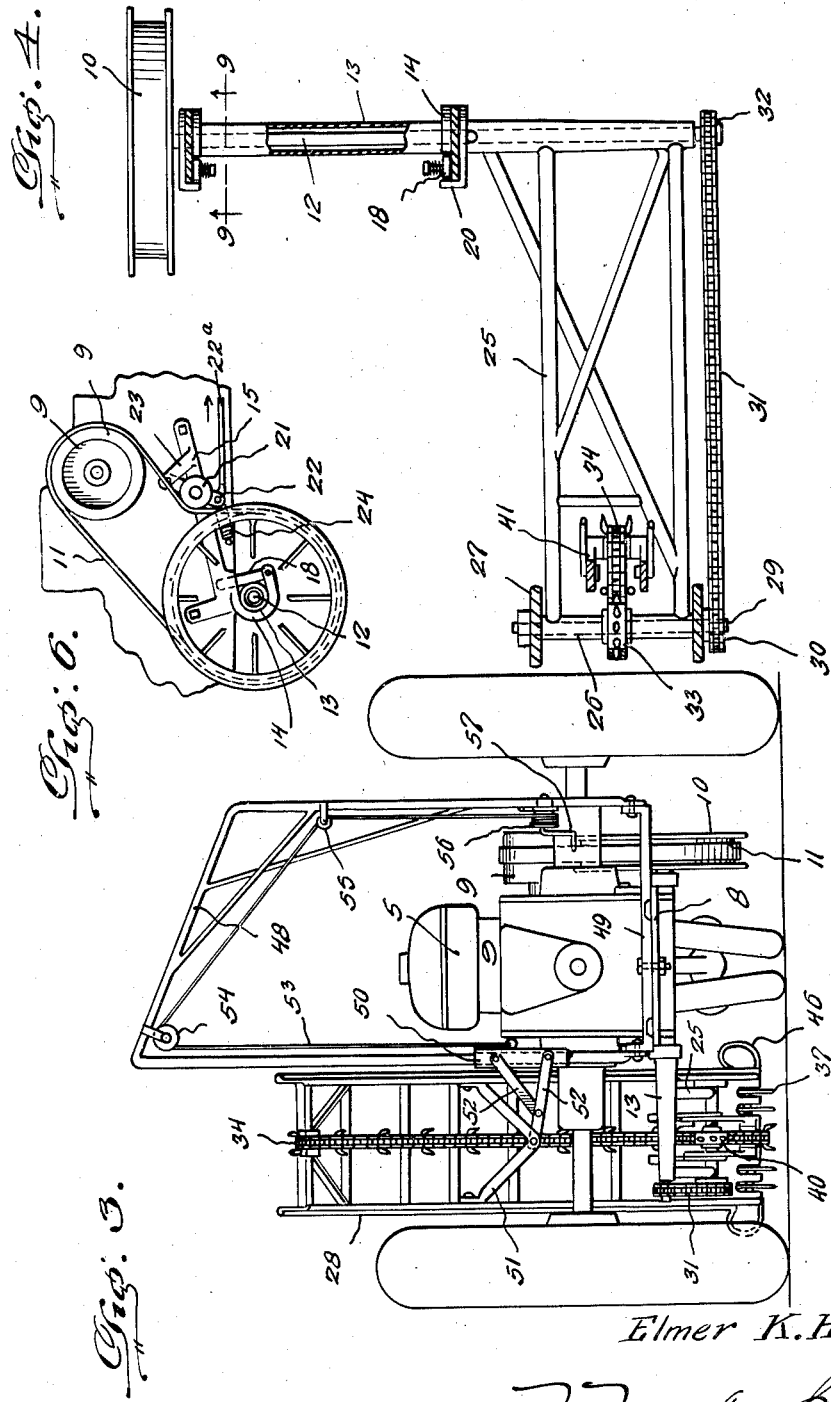

Patented May 14, 1946

2,400,086

UNITED STATES PATENT OFFICE 2,400,086

PORTABLE ELEVATOR

Elmer K. Hansen, Tilden, Nebr.

Application February 20, 1945, Serial No. 578,893

3 Claims. (Cl. 198—9)

The present invention relates to new and useful improvements in elevators, and more particularly to a portable elevator of this character adapted to pick up material in the form of bales from the ground and for transporting, elevating and unloading the bales into a wagon or storage building.

An important object of the present invention is to provide means for operatively mounting an elevator of this character on a tractor for operating the elevator from the power take-off thereof.

A further object of the invention is to provide means for vertically adjusting the discharge end of the elevator on the tractor.

A further important object of the invention is to provide simple and practical means for attaching the elevator to the tractor without necessitating material changes or alterations in the construction thereof.

Another object is to provide an apparatus of this character of simple and practical construction, which is strong and durable, efficient and reliable in operation, relatively inexpensive to manufacture, and install, in operative position on the tractor, and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a top plan view.

Figure 3 is a rear elevational view.

Figure 4 is a fragmentary sectional view taken substantially on a line 4—4 of Figure 1.

Figure 5 is a similar view taken substantially on a line 5—5 of Figure 1.

Figure 6 is a detail of the belt tightener for the drive means of the elevator from the power take-off of the tractor and forming a clutch device for controlling the operation of the elevator.

Figure 7 is an enlarged fragmentary sectional view taken substantially on a line 7—7 of Figure 2.

Figure 8 is an enlarged detail of the ratchet for the raising and lowering drum of the elevator.

Figure 9 is a sectional view taken substantially on a line 9—9 of Figure 4 and illustrating one of the hangers for pivotally supporting the elevator to the tractor.

Referring now to the drawings in detail, wherein for the purpose of illustration I have disclosed a preferred embodiment of the invention, the numeral 5 designates a tractor of conventional construction and including the rear axle 6, an axle housing 7 to which a rear platform 8 is attached. The tractor further includes a power take-off drive pulley 9 for driving the elevator pulley 10 by means of a belt 11, the pulley 10 being secured to a shaft 12 journaled in a housing 13 extending transversely under the tractor.

The housing 13 is supported in hanger brackets 14 which include upwardly extending arms 15 secured to a side of the tractor by means of bolts or the like 16. One of the hanger brackets is provided at each side of the tractor.

The hanger brackets 14 also include a saddle member 17 within which the housing 13 is positioned, one side of the saddle member being open to receive the housing which is retained therein by means of a pivoted locking arm 18 having one end pivoted to the lower edge of the saddle by means of a pin 19 and with its free end adapted for engagement behind a lug 20 carried by the brackets to secure the arm against open swinging movement.

A belt tightening pulley 21 is journaled on a plate 22 pivoted at one end to a bracket 23 extending from one of the arms 15, the pulley being yieldably held against the belt 11 by means of a coil spring 24.

A suitable control rod 22a, as shown in Figure 6, may also be connected to the plate 22 whereby the pulley 21 may be manually moved in a direction to place a maximum amount of slack in the belt 11 whenever it is desired to stop the drive between the power source and the present invention.

The shaft housing 13 is formed with a frame 25 extending longitudinally at one lower side of the tractor, the frame having a transversely extending sectional shaft housing 26 at its outer end pivotally secured in brackets 27 extending downwardly adjacent the front end of an elevator chute 28.

A shaft 29 is journaled in the housing 26 to one end of which is secured a sprocket 30 driven by a chain 31 from a sprocket 32 secured to the shaft 12.

A sprocket 33 is also secured to the shaft 29 intermediate its ends for driving an endless conveyor or elevator chain 34.

A shaft 35 is journaled at the front end of the elevator chute 28 and to which a sprocket 36 is secured driven by the chain 34. Also secured to the shaft 35 are a plurality of pick-up fingers 37 for rotation with the shaft.

The upper flight of the chain 34 travels in a channel 38 in the upper surface of the elevator chute 28 and around an idler sprocket 39 journaled at the upper end of the chute. The lower flight of the chain travels under the chute to the sprocket 33 and around the last-named sprocket to an idler sprocket 40 journaled at the lower end of an arm 41 pivoted to the under side of the chute. An adjusting bolt 42 is secured to the arm 41 and is threaded through guides 43 secured to the under side of the chute to swing the arm 41 for adjusting the tension of the chain 34.

At intervals the links of the chain 34 are provided with conveyor teeth or lugs 44.

A chain 45 connects the front end of the chute 28 to the front portion of the tractor 5, the chain limiting the lowering movement of the front end of the chute.

Also attached to the sides of the chute 28 at its front end is a pair of outwardly diverging pick-up guards 46 to guide bales of hay or other baled material toward the pickup fingers 37 and by means of which the bales 47 are moved onto the chute 28 and are conveyed rearwardly thereof by the teeth or lugs 44.

The front end of the chute 28 is pivoted on the housing 26 formed at the front end of the frame 25 which projects forwardly from the housing 13 whereby the chute is pivotally supported on the tractor.

A substantially inverted U-shaped hoisting frame 48 has its lower ends secured to the platform 8 by means of a cross bar 49, one side of the frame 48 forming a guide for a tubular slide 50 and to which the rear portion of the chute is attached by means of the brace structure 51, and arms 52, the arms being pivotally attached to the brace.

A cable 53 is attached at one end to the slide 50 and extends upwardly over pulleys 54 and 55 journaled at the upper portion and at the opposite sides of the frame and then downwardly around the drum 56 carried by the lower portion of the frame and operated by means of a hand crank 57. The drum includes a ratchet 58 with which a pivoted dog 59 is engageable to secure the drum against unwinding movement.

Accordingly, by operation of the hand crank 57 to wind the cable 53 thereon, the slide 50 may be raised on the frame 48 whereby to raise the rear end of the chute 28. Upon releasing the drum 56, the chute may be lowered by gravitation.

In the operation of the device, the tractor is moved over the ground by the bales of material to be conveyed and elevated whereby the bales 47 will be picked up by the fingers 37 and moved onto the chute.

The bales may be elevated and deposited directly into a wagon, or a predetermined number of the bales may be loaded onto the chute and may then be transported by the tractor for depositing the bales into a barn or other suitable storage building.

By reason of the vertical adjustment at the rear end of the chute, the front end thereof may likewise be adjusted relative to the ground.

In view of the foregoing description taken in connection with the accompanying drawings, it is believed that a clear understanding of the construction, operation and advantages of the device will be quite apparent to those skilled in the art. A more detailed description thereof is accordingly deemed unnecessary.

It is to be understood, however, that even though I have herein shown and described a preferred embodiment of my invention, the same is susceptible to certain changes fully comprehended by the spirit of the invention herein described, and the scope of the appended claims.

Having thus described the invention, what I claim is:

1. An elevator comprising a shaft adapted for operative connection with the power take-off of a tractor, hangers rotatably supporting the shaft transversely under the tractor, a forwardly extending frame supported on said shaft, a chute pivoted adjacent its front end on the front end of said frame, a shaft journaled at the front end of said frame, means operatively connecting said shafts, an endless conveyor having an upper flight arranged to travel along the upper surface of the chute and with its lower flight arranged to travel under the chute, means operatively connecting the lower flight of the conveyor to the last-named shaft, and means for vertically adjusting the rear end of the chute.

2. An elevator comprising a shaft adapted for operative connection with the power take-off of a tractor, hangers rotatably supporting the shaft transversely under the tractor, a forwardly extending frame supported on said shaft, a chute pivoted adjacent its front end on the front end of said frame, a shaft journaled at the front end of said frame, means operatively connecting said shafts, an endless conveyor chain having an upper flight arranged to travel along the upper surface of the chute and with its lower flight arranged to travel under the chute, a sprocket operatively connecting the lower flight of the chain to said second-named shaft, an idler sprocket carried by the chute and engaging the lower flight of the chain, adjustable means for the idler sprocket to adjust the tension of the chain, and means for vertically adjusting the rear end of the chute.

3. An elevator comprising a chute, an endless conveyor arranged to travel along the chute, means operatively connecting the conveyor to a power take-off of a tractor and including a shaft, a housing for the shaft, hangers for the housing adapted for attaching to a tractor and including saddles open at one side for receiving the housing, pivoted arms swingable into operation for closing the open sides of the hangers to secure the housing therein, means for locking the arms in closed position, a frame extending forwardly of the housing, means for pivotally attaching the chute adjacent its front end to the front end of said frame, and means for vertically adjusting the rear end of the chute.

ELMER K. HANSEN.